United States Patent [19]
Chang

[11] Patent Number: 5,785,338
[45] Date of Patent: Jul. 28, 1998

[54] COLLAPSIBLE BICYCLE

[76] Inventor: Teng-Shou Chang, No. 122 Chang-Sheng Road, Wai-Pu Hsiang, Taichung Hsien, Taiwan

[21] Appl. No.: 833,998

[22] Filed: Apr. 11, 1997

[51] Int. Cl.$^6$ ............................................. B62K 1/00
[52] U.S. Cl. .................................... 280/278; 280/287
[58] Field of Search ................................ 280/278, 287, 280/87.05, 279, 280, 281.1, 276

[56] References Cited

U.S. PATENT DOCUMENTS

| | | | |
|---|---|---|---|
| 3,722,913 | 3/1973 | Housayama | 280/278 X |
| 4,002,351 | 1/1977 | Zuck | 280/278 |
| 4,895,386 | 1/1990 | Hellestam et al. | 280/287 |

Primary Examiner—Brian L. Johnson
Assistant Examiner—Pamela J. Lipka
Attorney, Agent, or Firm—Morton J. Rosenberg; David I. Klein; Jun Y. Lee

[57] ABSTRACT

A collapsible bicycle frame includes a main frame having a front frame and a rear frame. A rear end of the front frame and a front end of the rear frame are pivotally connected. The rear end of the front frame includes a first engaging mechanism while the front end of the rear frame includes a second engaging mechanism for securely engaging with the first engaging mechanism when the front frame and the rear frame are in an extended status, and the first engaging mechanism and the second engaging mechanism disengages from each other when collapsing the bicycle.

5 Claims, 8 Drawing Sheets

COLLAPSIBLE BICYCLE

1. FIELD OF THE INVENTION

The present invention relates to a collapsible bicycle structure.

2. DESCRIPTION OF THE RELATED ART

A typical collapsible bicycle generally includes a front frame member and a rear frame member which are pivotally connected, in which a bolt is use to secure the front and rear frame members together when in use, and the bolt is removed when collapsing the bicycle. Such an arrangement is inconvenient in operation and has a high cost in manufacture.

The present invention is intended to provide an improved collapsible bicycle structure which mitigates and/or obviates the above problems.

SUMMARY OF THE INVENTION

A collapsible bicycle frame in accordance with the present invention includes a main frame having a front frame and a rear frame. A rear end of the front frame and a front end of the rear frame are pivotally connected. The rear end of the front frame includes a first engaging means while the front end of the rear frame includes a second engaging means for securely engaging with the first engaging means when the front frame and the rear frame are in an extended status, and the first engaging means and the second engaging means disengages from each other when collapsing the bicycle.

Other objects, advantages, and novel features of the invention will become more apparent from the following detailed description when taken in conjunction with the accompanying drawings.

DESCRIPTION OF THE PREFERRED EMBODIMENTS

Figure 1:
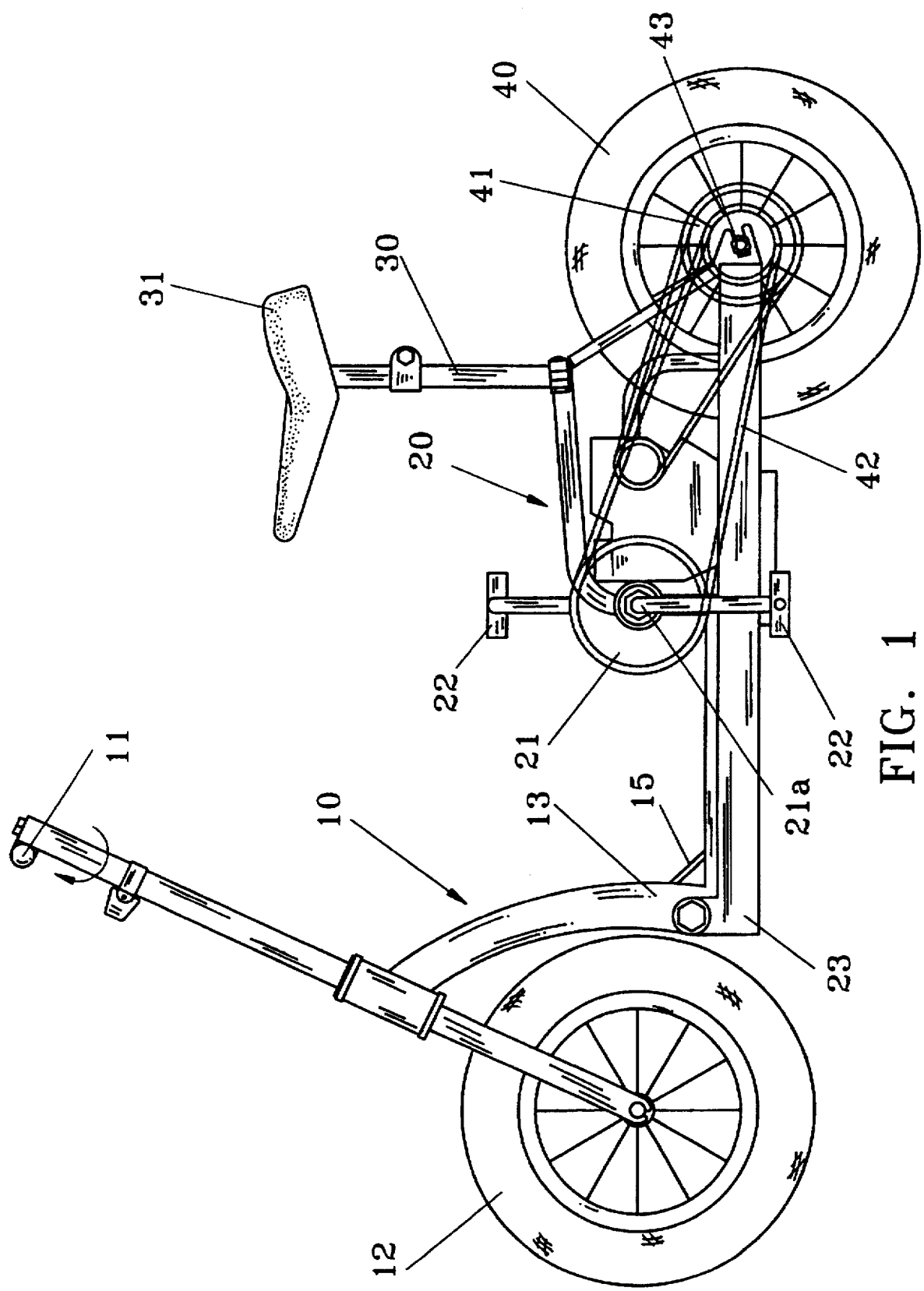
FIG. 1 is a perspective view of a collapsible bicycle in accordance with the present invention.

Referring to FIG. 1, a bicycle in accordance with the present invention generally comprises a main frame including a front frame 10 and a rear frame 20. A handlebar 11 is pivotally mounted to an upper end of the front frame 10 and a front wheel 12 is rotatably mounted to a lower end of the front frame 10. A seat 31 is mounted on top of a seat tube 30 of the rear frame 12. A pair of pedals 22 are securely mounted to a crank axle 21a around which a chain ring 21 is securely mounted to rotate therewith. A rear wheel 40 has a derailleur 41 mounted to a common axle 43 thereof, and a chain 42 is provided to interconnect the chain ring 21 with the derailleur 41. The above-mentioned structure is conventional and therefore not further described.

Figure 2:
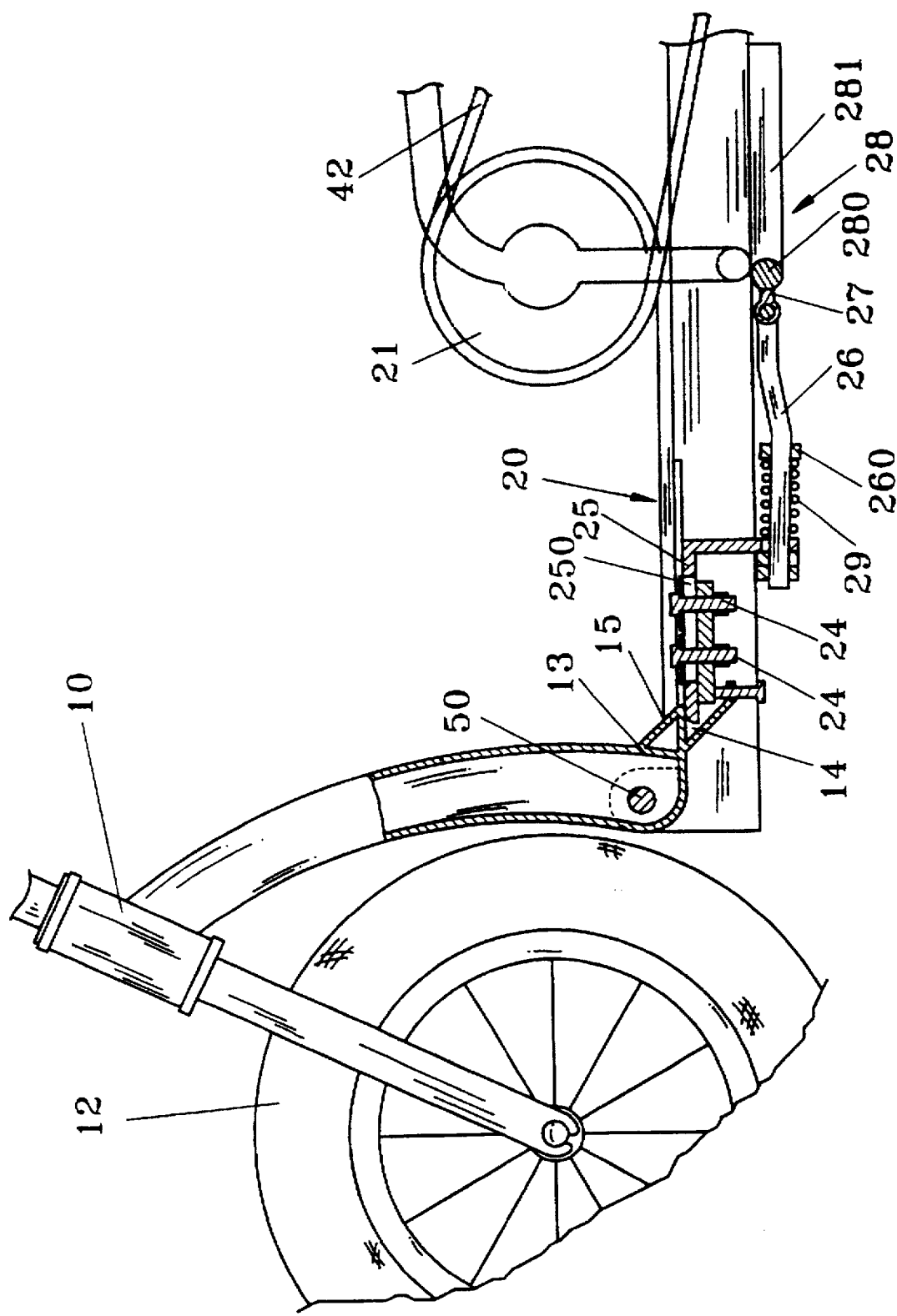
FIG. 2 is an enlarged view, partly sectioned, of a part of the collapsible bicycle in accordance with the present invention.

Referring to FIGS. 1 and 2, a rear end 13 of the front frame 10 and a front end 23 of the rear frame 20 are pivotally connected at 50. The rear end 13 of the front frame 10 may include a first engaging means while the front end 23 of the rear frame 20 may include a second engaging means for securely engaging with the first engaging means when the front frame 10 and the rear frame 20 are in an extended status, and the first engaging means and the second engaging means disengages from each other when collapsing the bicycle.

In an embodiment of the invention, as shown in FIG. 2, the first engaging means 10 includes a receiving compartment 14, while the second engaging means 20 includes at least one guiding rod 24 extending in a vertical direction, a sliding block 25 mounted around the guiding rod 24 and slidable along a longitudinal direction of the main frame, the sliding block 25 having an elongate hole 250 through which the guiding rod 24 extends. In addition, a push rod 26 is attached to an end of the sliding block 25 and includes a flange 260 formed on a mediate portion thereof. A spring 29 is mounted around the push rod 26 between the flange 260 and the end of the sliding block 25. A push seat 27 is mounted to the other end of the push rod 26 such that longitudinal movement of the push seat 27 causes longitudinal movements of the push rod 26 and the sliding block 25. Furthermore, a foot peg means 28 has a shaft 280 pivotally connected to the rear frame 20, and the push seat 27 is securely attached to the shaft 280 to move therewith. The foot peg means 28 may include two feet 281 respectively extending from two ends of the shaft 280. When the feet 281 are in a vertical position on ground, they provide a support for the whole bicycle. The rear end 13 of the front frame 10 may further include a reinforcing plate 15 having an inclined surface to guide the sliding block 25 into the receiving compartment 14 when the front frame 10 pivots counterclockwise.

Referring to FIG. 1, the feet 281 of the foot peg means 28 extend in a horizontal position, and the bicycle is ready for cycling. It is appreciated that the sliding block 25 engages with the receiving compartment 14 such that the front frame 10 and the rear frame 20 are not pivotable.

Figure 3:
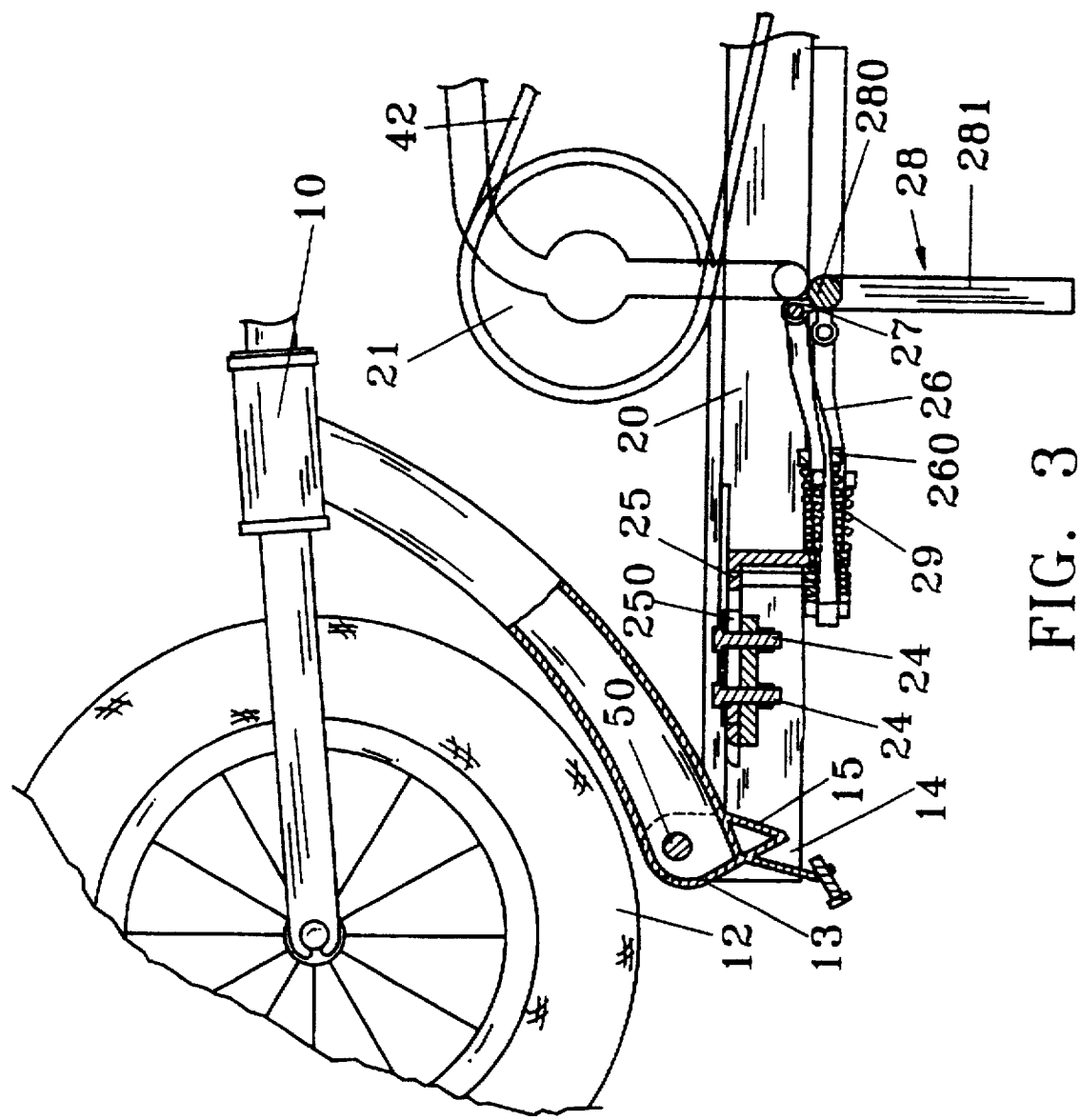
FIG. 3 is a view similar to FIG. 2, illustrating collapse of the bicycle in accordance with the present invention.
Figure 4:
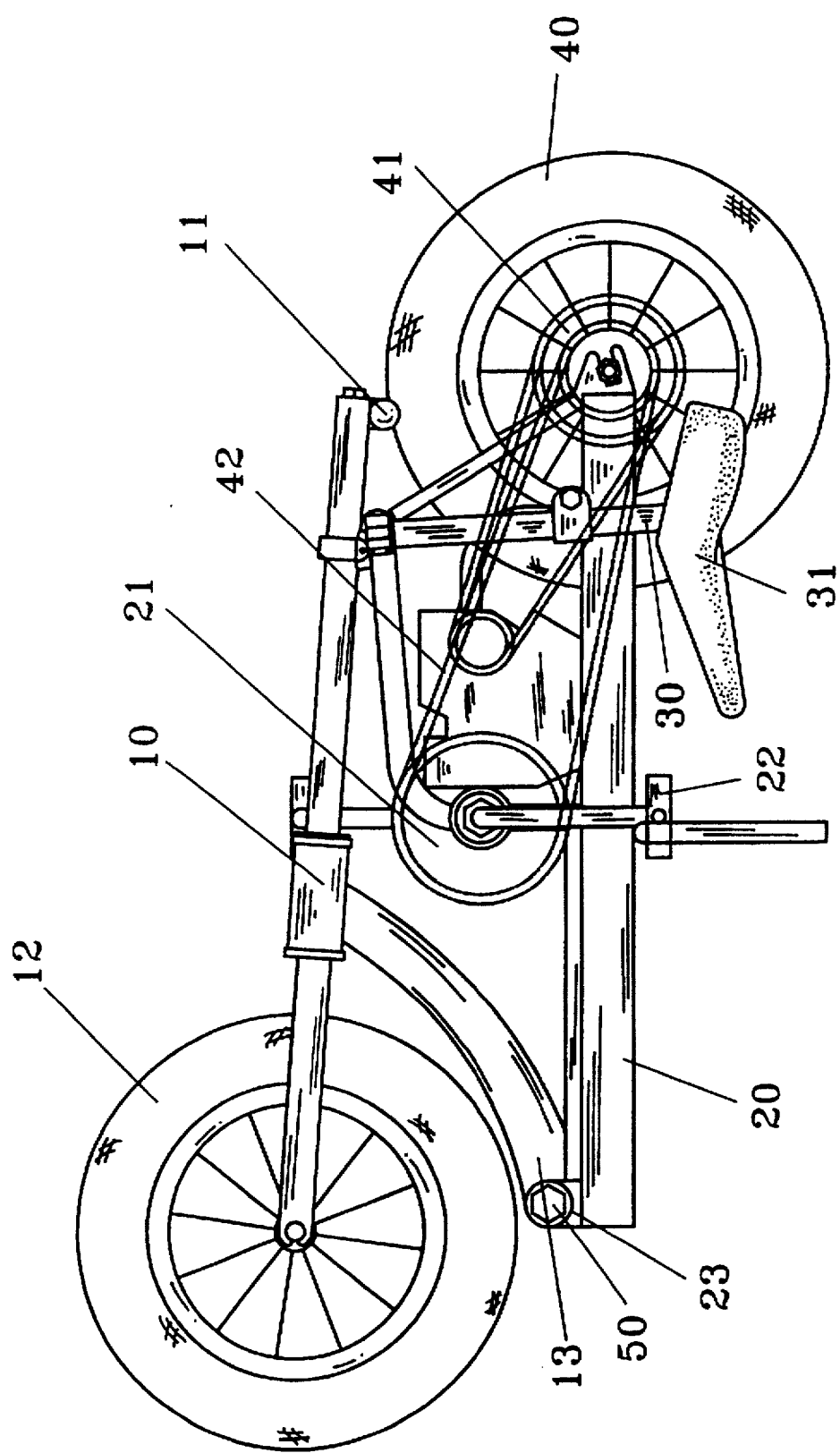
FIG. 4 is a schematic side view of the bicycle in a collapsed status.

Referring to FIG. 3, when the feet 281 of the foot peg means 28 are on the ground (in a vertical direction), the push seat 27 is urged to move slightly upwardly which, in turn, causes the push rod 26 and the sliding block 25 to move rearwardly such that the sliding block 25 disengages from the receiving compartment 14, thereby allowing relative pivotal movements between the front frame 10 and the rear frame 20. Accordingly, the bicycle can be collapsed to a status shown in FIG. 4. A reverse operation may extend the bicycle to a status shown in FIG. 1 for cycling.

Figure 5:
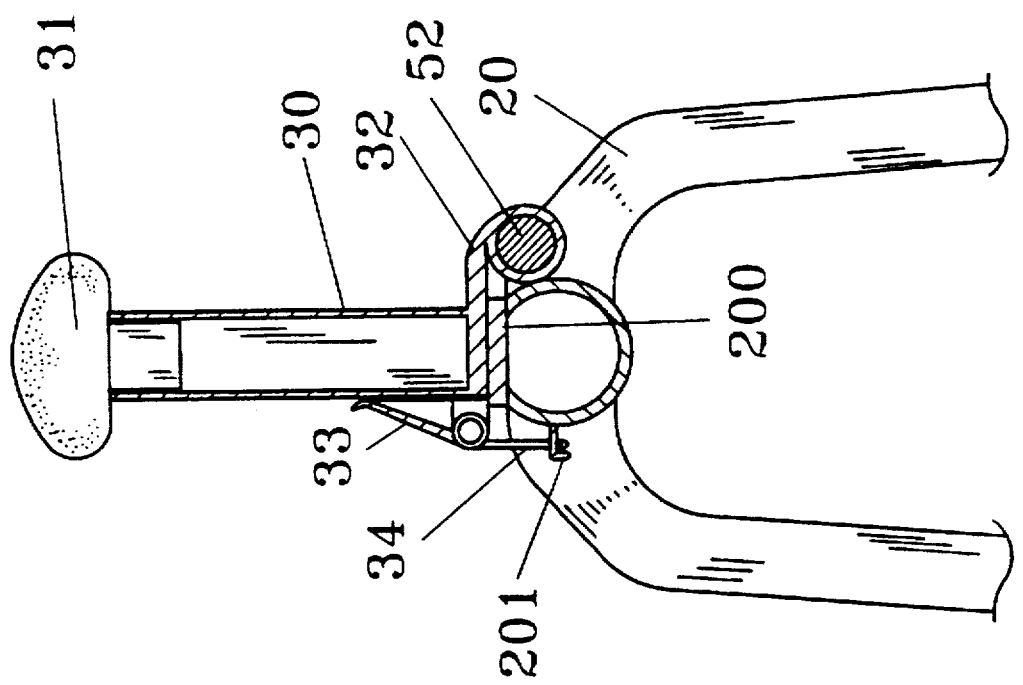
FIG. 5 is a schematic elevational view, partly in section, of a collapsible seat arrangement in accordance with the present invention.
Figure 6:
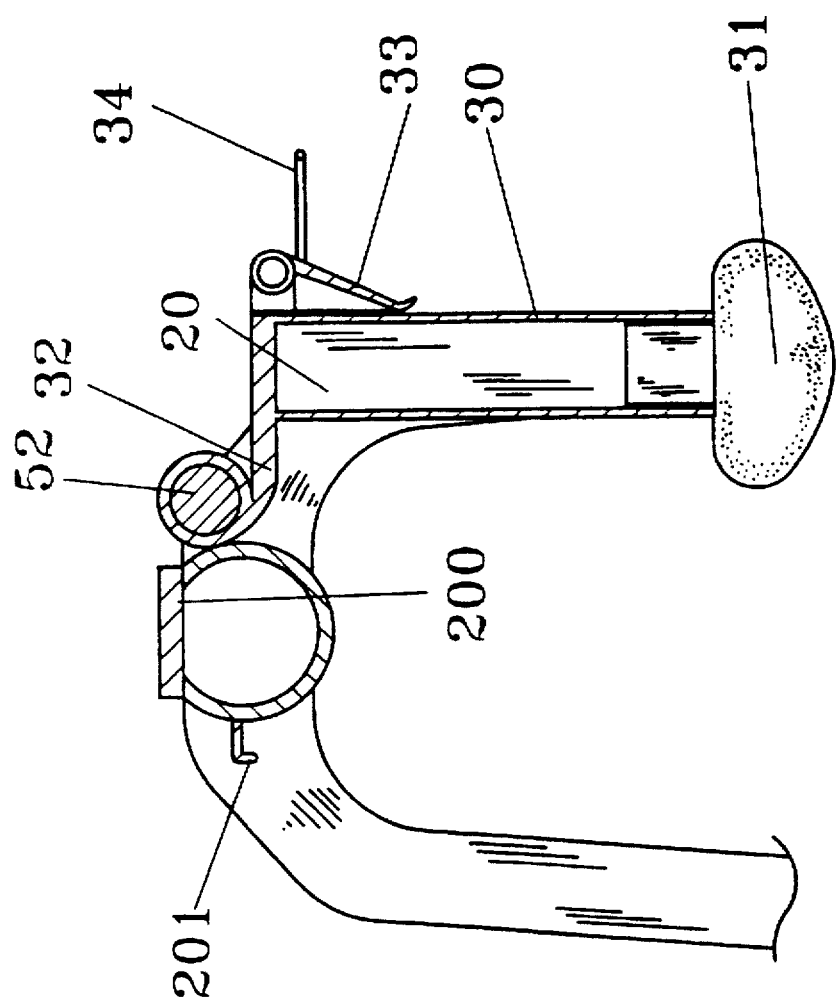
FIG. 6 is a view similar to FIG. 5, in which the seat is in a collapsed status.
Figure 7:
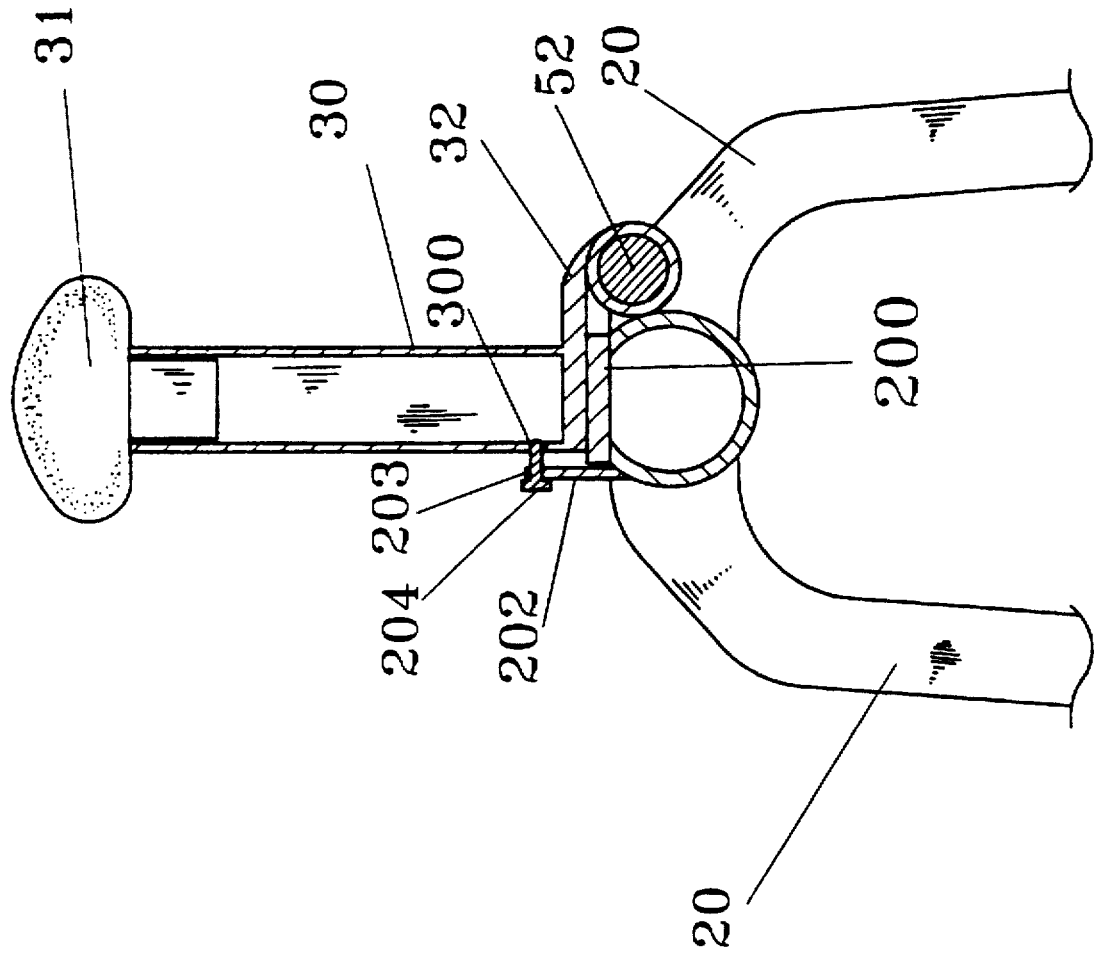
FIG. 7 is a schematic elevational view, partly in section, of another embodiment of a collapsible seat in accordance with the present invention.
Figure 8:
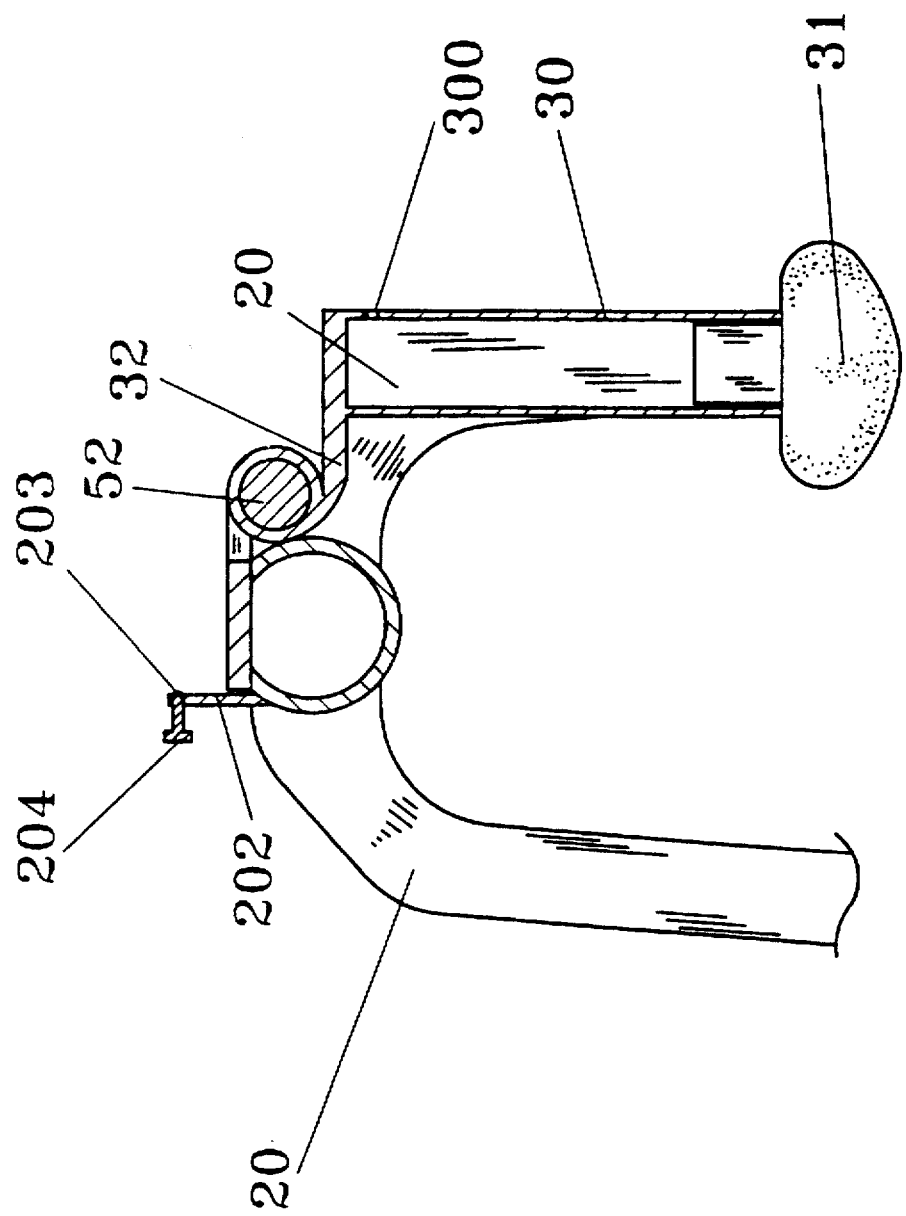
FIG. 8 is a view similar to FIG. 7, in which the seat is in a collapsed status.

Referring to FIGS. 5 and 6, the seat tube 30 may include a lower end 32 which is pivotally connected to a pivotal section 200 of the rear frame 20 at 52. A locking mechanism is provided to keep the seat tube 30 in secure engagement with the rear frame 20 for cycling. The locking mechanism includes a lever 33 pivotally mounted to the seat tube 30 and a retainer ring 34 pivotally mounted to the lever 33, and the rear frame 20 includes a hook 201. As shown in FIG. 5, when the retainer ring 34 engages with the hook 201, the user may pull the lever 33 upwardly which causes the retainer ring 34 to move slightly upwardly, thereby securely engaging with the hook 201. Referring to FIG. 6, when collapsing, the lever 33 is pulled downwardly to allow disengagement of the retainer ring 34 from the hook 201, thereby allowing pivotal movement of the seat tube 30. FIGS. 7 and 8 illustrates a modified embodiment of the locking mechanism, in which the rear frame 20 includes an extension 202 having a screw hole 203 defined therein, and a bolt 204 is extended through the screw hole 203. The seat tube 30 further includes a screw hole 300 defined in a periphery thereof. When the seat tube 30 is in an upright position, the screw hole 300 is in alignment with the screw hole 203, and the bolt 204 is extended into the screw hole 300 to secure the seat tube 30 and the rear frame 20 together. Disengagement of the bolt 204 from the screw hole 300 allows pivotal movement of the seat tube 30 relative to the rear frame 20.

Although the invention has been explained in relation to its preferred embodiment, it is to be understood that many other possible modifications and variations can be made without departing from the spirit and scope of the invention as hereinafter claimed.

What is claimed is:

1. A collapsible bicycle frame including a main frame having a front frame having a rear end and a rear frame having a front end pivotally connected to the rear end of the front frame, the rear end of the front frame including a first engaging means while the front end of the rear frame including a second engaging means for securely engaging with the first engaging means when the front frame and the rear frame are in an extended status, and the first engaging means and the second engaging means disengages from each other when collapsing the bicycle, the second engaging means including:
at least one guiding rod extending in a vertical direction,
a sliding block mounted around the guiding rod and slidable along a longitudinal direction of the main frame, the sliding block having an elongate hole through which the guiding rod extends, the sliding block having a first end for releasably engaging with the first engaging means and a second end,
a push rod attached to the second end of the sliding block at an end thereof,
a push seat mounted to the other end of the push rod such that longitudinal movement of the push seat causes longitudinal movements of the push rod and the sliding block, and
a foot peg means having a shaft pivotally connected to the rear frame, and the push seat being securely attached to the shaft to move therewith, the foot peg means including at least one foot extending from an end of the shaft,
whereby when the foot of the foot peg means extends in a horizontal position, the sliding block engages with the first engaging means such that the front frame and the rear frame are not pivotable, and
the foot provides a support for the bicycle when the foot is in a vertical position on the ground in which the sliding block disengages from the first engaging means and thus allows pivotal movement of the front frame relative to the rear frame to a collapsed status.

2. The collapsible bicycle frame according to claim 1, wherein the first engaging means includes a receiving compartment for engaging with the sliding block.

3. The collapsible bicycle frame according to claim 1, wherein a seat tube of the main frame includes a lower end which is pivotally connected to a pivotal section of the rear frame, and further includes a locking mechanism in which the seat tube is in secure engagement with the rear frame for cycling when the locking mechanism is in a locking status, and the seat tube is pivotable relative to the rear frame when the locking mechanism is in an unlocked status.

4. The collapsible bicycle frame according to claim 3, wherein the locking mechanism includes a lever pivotally mounted to the seat tube and a retainer ring pivotally mounted to the lever, and the rear frame includes a hook for releasable engagement with the retainer ring.

5. The collapsible bicycle frame according to claim 3, wherein the locking mechanism includes a first screw hole defined in an extension of the rear frame, a bolt is extended through the first screw hole, and the seat tube includes a second screw hole defined in a periphery thereof, when the seat tube is in an upright position, the second screw hole is in alignment with the first screw hole, and the bolt is extended into the second screw hole to secure the seat tube and the rear frame together, and disengagement of the bolt from the second screw hole allows pivotal movement of the seat tube relative to the rear frame.

* * * * *